Textile Cord (Such as cotton, rayon, nylon and a polyester derived from terephthalic acid and ethylene glycol)

Vulcanizable Rubbery Aliphatic Conjugated Diene Polymer (Including natural and synthetic.)

Dried deposit of mixture of a vulcanizable rubber latex (natural or butadiene-styrene copolymer) and water solution of condensation product of aliphatic amine aliphatic dicarboxylic acid and an aldehyde.

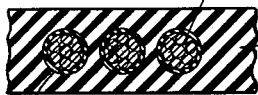

Textile Cord.

Vulcanizable Rubbery Aliphatic Conjugated Diene Polymer (Including natural and synthetic.)

Dried deposit of mixture of a vulcanizable rubber latex (natural or butadiene-styrene copolymer) and water solution of condensation product of aliphatic amine and aliphatic dicarboxylic acid.

Inventor
Matthew W. Wilson
By Robert W. Furlong
Atty.

Patented Oct. 9, 1951

2,570,895

UNITED STATES PATENT OFFICE 2,570,895

RUBBER TO FABRIC ADHESION WITH MIXTURE OF LATEX AND POLYAMINE-POLYACID CONDENSATION PRODUCT ADHESIVE

Matthew W. Wilson, Cuyahoga Falls, Ohio, assignor to The B. F. Goodrich Company, New York, N. Y., a corporation of New York Application December 1, 1947, Serial No. 789,141

13 Claims. (Cl. 154—139)

1

This invention relates to the adhesion of filamentary materials such as yarn, cord, and fabric composed of nylon, rayon, and other synthetic organic textile fibers to a body of rubber material in the production of a composite structure of rubber and filamentary material.

It is an object of this invention to provide an improved method of treating filamentary materials before they are joined with a body of rubber to form a composite structure in which the filamentary materials are in adhering relationship with the body of rubber. It is also an object to provide an adhesive which is suitable for treating filamentary materials having a hydrophobic surface before these materials are joined with a body of rubber material in an adhesive relationship. It is a further object to provide a method of treating synthetic cords which have a hydrophobic surface with an adhesive prior to joining the cords with a body of rubber to form a composite rubber-filamentary material structure. Another object is to provide a vulcanized composite article of rubber material and filamentary material having improved adhesion between the members. Other objects will be apparent from the description which follows.

In the manufacture of pneumatic tires, reinforced rubber belts, and other composite structures of rubber and filamentary material, it is a common procedure to treat the filamentary material with an adhesive before joining the filamentary material and the body of rubber prior to vulcanization. Since the advent of synthetic filamentary materials such as nylon and rayon in the manufacture of tires and other similar products, it has been found that it is more and more difficult to provide an adhesive that will give the necessary adhesion between the filamentary material and the body of rubber. Many of the synthetic filamentary materials have hydrophobic surfaces which tend to be impervious to the usual adhesives employed. Certain synthetic filamentary materials such as one which is a polyester of terephthalic acid and ethylene glycol and which will be designated herein as synthetic cord "B" may not be satisfactorily used with the known adhesives. The surface of this filamentary material is hydrophobic to such an extent that the ordinary adhesives will not wet the surface and thus the desired adhesive properties cannot be attained.

It has now been found that a mixture comprising (1) an aqueous dispersion of natural or synthetic rubber and (2) a solution of a water-soluble resin, is very satisfactory as an adhesive with which such hydrophobic filamentary materials may be treated before joining these materials with a body of rubber to form a composite article.

Such an adhesive is used as is shown in the accompanying drawings wherein

Fig. 1 is a cross-sectional view of a composite rubber and textile cord article having a dried deposit of an adhesive of this invention interposed between the rubber body and textile cords; and Fig. 2 shows another embodiment of the invention.

The water-soluble resin may be one such as that resulting from the condensation of an aliphatic polyamine and an aliphatic dicarboxylic acid followed by further condensation of this product with an aldehyde. The dicarboxylic acid may be one from the class comprising oxalic, malonic, succinic, glutaric, adipic, pimelic, suberic, azeleic, sebacic, and similar acids. The polyamine may be one from the class comprising ethylene diamine, diethylene triamine, triethylene tetramine, tetra ethylene pentamine, propylene diamine, etc., or a mixture of polyamines such as a mixture of ethylene diamine and triethylenetetramine. Particularly preferred are those aliphatic acids and amines which contain, in addition to the carboxyl and amino groups, only carbon and hydrogen.

The resin may also be one resulting from the condensation of an aliphatic polyamine and an aliphatic dicarboxylic acid with no further condensation with an aldehyde. However, the preferred resin will be one which has been further condensed with an aldehyde selected from the class consisting of formaldehyde, acrolein, and furfural. The results obtained using acrolein or furfural to replace the formaldehyde described in the preferred embodiment below are substantially the same as those obtained using formaldehyde, although the latter is preferred.

Such an adhesive affords a much greater adhesion between synthetic cord "B" and natural rubber, or synthetic rubber prepared by the polymerization of an aliphatic conjugated diene. Although this new adhesive is especially suited for this particular filamentary material, it is also suitable for nylon and other synthetic yarns, cords, or fabrics which have hydrophobic surfaces.

A preferred embodiment of this invention will be illustrated in the following example. In the preparation of an adhesive, 20 parts by weight of triethylene tetramine and 15 parts of adipic acid were mixed and then condensed by heating at a temperature of from 180° to about 210° C. for 30 minutes. The resulting syrup was then poured into 80 parts of water and stirred until dissolved. To this solution 40 parts of formaldehyde (40% aqueous solution) was then added and the mixture allowed to stand at room temperature for about one hour to form a condensation product with the formaldehyde. The product was then combined with a latex by dissolving six parts of the final condensate in 50 parts of water and the resulting solution added to 44 parts of a butadiene-styrene synthetic rubber latex which contained 33.6% rubber solids.

In the preparation of the resin equimolecular portions of triethylene tetramine and adipic acid may be used, but variations may be made in these proportions. For instance, a slight excess, up to about 60% by weight of triethylene tetramine such as was used in the preferred embodiment will give good results. The amount of formaldehyde used to further condense the resin is not critical, for a large excess over that used in the specific example will give just as good results. For instance, when 20 parts of triethylenetetramine and 15 parts of adipic acid are the starting proportions in the preparation of the adhesive, from 30 to 80 parts of 40% formaldehyde solution may be used. In addition other aldehydes may be substituted for the formaldehyde. Acrolein, furfural, and formaldehyde are the preferred aldehydes to be used. The proportion of rubber and resin in the adhesive may vary considerably. The ratio of resin to rubber solids may vary from about 1:10 to 1:3 by weight. The resin content should be less than 33% by weight of the rubber solids content but not less than 10% by weight of the rubber solids content. The proportion of rubber solids in the latex employed is not critical and may be varied over a wide range, from 10% by weight of the latex or less up to 60% or more.

The adhesive obtained was used to treat cords which were to be used in the manufacture of pneumatic tires, belts, and other composite rubber and filamentary material products. Synthetic cord "B" was treated as follows.

The cords were dipped in the adhesive prepared as described above. The cords were then dried while under tension in an oven at about 125° C. for about 10 minutes. After the cords were thus treated, they were combined with a body of rubber by calendering the rubber on the cords, and a very good resulting bond between the rubber and the cords was obtained when this composite product was vulcanized. The following results were obtained by joining a natural rubber compound and synthetic cord "B" which was treated by the method outlined in the preferred embodiment of this invention followed by vulcanization of the rubber in the composite product. Dip "A" is the adhesive disclosed herein and dip "B" is one of the resorcinol-formaldehyde-latex adhesives now in common use. All results were obtained by using the single cord test described in vol. 19, pages 223, 232, Rubber Chemistry and Technology, published January 1946.

| Dip | Synthetic Cord "B" |
|---|---|
| "A" | 412 pounds. |
| "B" | 236 pounds. |
| No dip | Less than 100 pounds. |

By using the new dip, the adhesion of synthetic cord "B" to a natural rubber carcass compound such as the one used in the test has been increased by 50% over that when the resorcinol-formaldehyde latex adhesive was used.

In the last step which was described in the preparation of the new adhesive, a portion of high adhesive latex was added. Any good latex may be added, including natural rubber latex or a synthetic rubber latex. One such latex may consist of a dispersed rubbery material, possibly the same type of rubbery material with which the fibrous material is to be associated in the final composite structure. A preferred synthetic rubber latex may be prepared by the polymerization in an aqueous emulsion of a conjugated diene containing an open aliphatic chain such as butadiene-1,3, isoprene, 2,3-dimethyl butadiene-1,3, 2-chloro butadiene-1,3, or the like, either alone or in admixture with each other or with other unsaturated compounds copolymerizable therewith, such as styrene, methyl acrylate, methyl methacrylate, methyl isopropenyl ketone, acrylonitrile, isobutylene, and the like. A modification in the preparation of the resin is possible. For instance, instead of using a polyamine and a dibasic acid as the starting materials, a mixture of polyamines may be substituted for the lone polyamine. To obtain a more tough and a less thermoplastic resin 15 parts of adipic acid may be mixed with 3 parts of ethylene diamine and 14 parts of triethylene tetramine and then condensed by heating at a temperature of about 200° C. for one-half hour. The product may then be poured into 80 parts of water and stirred until dissolved. To this solution may be added 40 parts of formaldehyde (40% aqueous solution) and when the mixture has further condensed for about one hour at room temperature, 6 parts of the product may be combined with 50 parts of water. To this solution may then be added 44 parts of a high adhesive latex, the latex preferably being a dispersion of the same rubbery material with which the fibrous material is to be joined in the composite rubber filamentary material product. When synthetic cord "B" was treated with this adhesive by a dipping and drying process and then joined with a natural rubber compound and vulcanized, the adhesion between the rubber and cord was increased 50% over that obtained when a resorcinol formaldehyde latex adhesive was used.

Another embodiment of this invention will be illustrated as follows. In the preparation of an adhesive, 20 parts by weight of triethylenetetramine and 15 parts of adipic acid were mixed and condensed by heating at a temperature of from 180° to 210° C. for 30 minutes. The resulting syrup was then poured into 80 parts of water and stirred until dissolved. Six parts of this solution in 50 parts of water were then combined with 44 parts of a butadiene-styrene rubber latex which is 33.6% rubber solids. This adhesive was used in the fabrication of a composite rubber-cord structure in a manner similar to that used in the preferred embodiment of this invention. A satisfactory adhesion was obtained with the use of this adhesive but the preferred adhesive is one which contains a resin that is a condensation product of an aliphatic dicarboxylic acid, an aliphatic polyamine, or mixture of polyamines, and an aldehyde.

The adhesives described in the examples may be satisfactorily used to treat such a filamentary material as one which is a polyester derived from terephthalic acid and ethylene glycol so that the filamentary material may be joined with a body of rubber in an adhesive relationship. Although the treatment of cords in synthetic cord "B" was discussed in detail, other forms of the material such as yarns or fabrics may be treated in the dip process similar to the process outlined. Also, other synthetic fabrics, including nylon, may be treated with the adhesives of this invention with satisfactory results being obtained when they are joined with a body of rubber and vulcanized to form a composite product. The body of rubber with which the treated cords or fabric is combined may be a natural rubber compound such as was used in the example or a compound containing a synthetic rubber such as one prepared by the polymerization of a conjugated diene containing an open aliphatic chain such as butadiene-1,3, isoprene, 2,3-dimethyl butadiene-1,3, 2-chloro butadiene-1,3, or the like, either alone or in admixture with other dienes or with other unsaturated compounds copolymerizable therewith, such as styrene, methyl acrylate, methyl methacrylate, methyl isopropenyl ketone, acrylonitrile, isobutylene, and others.

While I have herein disclosed certain specific embodiments of my invention, I do not intend to limit myself solely thereto, but to include all of the obvious modifications and variations falling within the spirit and scope of the appended claims.

I claim:

1. A method of making an adhesive comprising the steps of mixing a butadiene-styrene synthetic rubber latex with an aqueous solution of the product obtained by condensing at from about 180° to 210° C. substantially equimolecular portions of triethylene tetramine and adipic acid and then further condensing with formaldehyde.

2. A method of making an adhesive comprising the steps of adding 44 parts of a butadiene-styrene synthetic rubber latex, said latex being about 33% rubber solids, to an aqueous solution of the product obtained by condensing at from about 180° to 210° C. 20 parts of triethylene tetramine with 15 parts of adipic acid and then further condensing with 40 parts of formaldehyde, said formaldehyde being a 40% solution.

3. In a method of making a composite product comprising textile fibers having a hydrophobic surface and a body of a vulcanizable rubbery aliphatic conjugated diene polymer, the steps which comprise coating said fibers with an adhesive comprising a mixture of an aqueous dispersion of a vulcanizable rubbery aliphatic conjugated diene polymer and a water solution of the product obtained by condensing at from about 180° to 210° C. substantially equimolecular portions of an aliphatic polyamine having 3 or more amine groups and an aliphatic dicarboxylic acid, drying said fibers, associating said fibers with said body of rubbery polymer, and heating the composite product to effect vulcanization of said polymer.

4. In a method of making a composite product comprising textile fibers and a body of a vulcanizable rubbery aliphatic conjugated diene polymer, the steps which comprise coating said fibers with an adhesive comprising a mixture of an aqueous dispersion of a vulcanizable rubbery aliphatic conjugated diene polymer and a water solution of the product obtained by condensing at from about 180° to 210° C. substantially equimolecular portions of an aliphatic polyamine having 3 or more amine groups and an aliphatic dicarboxylic acid and then further condensing with formaldehyde, drying said fibers, associating said fibers with said body of rubbery polymer, and heating the composite product to effect vulcanization of said polymer.

5. In a method of making a composite product comprising textile fibers and a body of a vulcanizable rubbery aliphatic conjugated diene polymer, the steps which comprise coating said fibers with an adhesive comprising a mixture of a butadiene-styrene synthetic rubber latex and a water solution of the product obtained by condensing at from about 180° to 210° C. substantially equimolecular portions of triethylene tetramine and adipic acid and then further condensing with formaldehyde, drying said fibers, associating said fibers with said body of rubbery polymer, and heating the composite product to effect vulcanization of said polymer.

6. In a method of making a composite product comprising, one, a body of a vulcanizable rubbery aliphatic conjugated diene polymer and, two, synthetic reinforcing cords comprising a polyester derived from terephthalic acid and ethylene glycol, the steps which comprise coating said cord with an adhesive comprising a mixture of a butadiene-styrene synthetic rubber latex and a water solution of the product obtained by condensing at from about 180° to 210° C. substantially equimolecular portions of triethylene tetramine and adipic acid and then further condensing with formaldehyde, drying said coated cord, associating said coated cord with said body of rubbery polymer, and then heating the said composite product to effect vulcanization of said polymer.

7. In a method of making a composite product comprising, one, a body of a vulcanizable rubbery aliphatic conjugated diene polymer and, two, synthetic reinforcing cords comprising a polyester derived from terephthalic acid and ethylene glycol, the steps which comprise coating said cord with an adhesive comprising a mixture of 44 parts of a butadiene-styrene synthetic rubber latex, said latex being about 33% rubber solids, and a water solution of the product obtained by condensing at from about 180° to 210° C. 20 parts of triethylene tetramine with 15 parts of adipic acid and then further condensing with 40 parts of formaldehyde, said water solution consisting of 50 parts of water and 6 parts of the condensation product, drying said coated cord, then associating said coated cord with said body of rubbery polymer, and then heating said composite product to effect vulcanization of said polymer.

8. In a method of making a composite product comprising, one, a body of a vulcanizable rubbery aliphatic conjugated diene polymer and, two, synthetic reinforcing cords comprising a polyester derived from terephthalic acid and ethylene glycol, the steps which comprise coating said cords with an adhesive comprising a mixture of 44 parts of a butadiene-styrene synthetic rubber latex, said latex being about 33% rubber solids and a water solution of the product obtained by condensing at from 180° to 210° C. 20 parts of triethylene tetramine with 15 parts of adipic acid and then further condensing this product with 40 parts of formaldeyhde at from 20° to 30° C., said water solution consisting of 50 parts of water and 6 parts of the condensation product, drying said coated cord, then associating said coated cord with said body of rubber material, and then heating said composite product to effect vulcanization of said rubbery polymer.

9. A composite product comprising a textile fiber, a body of a vulcanizable rubbery aliphatic conjugated diene polymer, and an adhesive securing said body of rubbery polymer to said fiber, said adhesive comprising the dried deposit from a mixture of a butadiene-styrene synthetic rubber latex and a water solution of the condensation product obtained by condensing at from about 180° to 210° C. substantially equimolecular portions of triethylene tetramine and adipic acid and then adding formaldehyde.

10. An adhesive for adhering rubber to a textile fiber comprising a mixture of an aqueous dispersion of a vulcanizable rubbery aliphatic conjugated diene polymer and a water solution of the product obtained by condensing at from about 180° to 210° C. substantially equimolecular portions of an aliphatic polyamine having at least three amine groups and an aliphatic dicarboxylic acid.

11. An adhesive for adhering rubber to a textile fiber comprising a mixture of an aqueous dispersion of a vulcanizable rubbery aliphatic conjugated diene polymer and a water solution of the product obtained by condensing at from about 180° to 210° C. substantially equimolecular portions of an aliphatic polyamine having at least three amine groups and an aliphatic dicarboxylic acid and then further condensing with an aldehyde selected from the class consisting of formaldehyde, acrolein, and furfural.

12. An adhesive for adhering rubber to a textile fiber comprising a mixture of natural rubber latex and a water solution of the product obtained by condensing at from about 180° to 210° C. substantially equimolecular portions of triethylene tetramine and adipic acid and then further condensing with formaldehyde.

13. An adhesive for adhering rubber to a textile fiber comprising a mixture of 44 parts by weight of a butadiene-styrene synthetic rubber latex, said latex being about 33% rubber solids and a water solution of the product obtained by condensing at from about 180° to 210° C. 20 parts by weight of triethylene tetramine with 15 parts of adipic acid and then further condensing with 40 parts of formaldehyde, said solution consisting of 50 parts of water and 6 parts of the condensation product.

MATTHEW W. WILSON.

REFERENCES CITED

The following references are of record in the file of this patent:

UNITED STATES PATENTS

| Number | Name | Date |
| --- | --- | --- |
| 2,065,941 | Lane | Dec. 29, 1936 |
| 2,429,397 | Compton | Oct. 24, 1947 |
| 2,443,486 | Watkins | June 15, 1948 |

FOREIGN PATENTS

| Number | Country | Date |
| --- | --- | --- |
| 474,601 | Great Britain | Nov. 1, 1937 |